United States Patent [19]
Suzuki et al.

[11] Patent Number: 6,114,001
[45] Date of Patent: Sep. 5, 2000

[54] OPTICAL INFORMATION RECORDING MEDIUM, AND METHOD FOR FABRICATING IT

[75] Inventors: Masaru Suzuki, Fuji; Akihiko Ohyama, Numazu, both of Japan

[73] Assignee: Asahi Kasei Kogyo Kabushiki Kaisha, Osaka, Japan

[21] Appl. No.: 09/230,948

[22] PCT Filed: Jun. 3, 1998

[86] PCT No.: PCT/JP98/02453

§ 371 Date: Apr. 1, 1999

§ 102(e) Date: Apr. 1, 1999

[87] PCT Pub. No.: WO98/55994

PCT Pub. Date: Dec. 10, 1998

[30] Foreign Application Priority Data

Jun. 6, 1997 [JP] Japan ................................. 9-149098

[51] Int. Cl.⁷ ............................................. B32B 3/00
[52] U.S. Cl. .................. 428/64.1; 428/64.4; 428/64.5; 428/64.6; 428/913; 430/270.13; 430/495.1; 430/945; 369/283; 369/288
[58] Field of Search ................... 428/64.1, 64.2, 428/64.4, 64.5, 64.6, 913; 430/270.13, 495.1, 945; 369/283, 288

[56] References Cited

U.S. PATENT DOCUMENTS

| | | |
|---|---|---|
| 4,847,132 | 6/1989 | Takao et al. . |
| 5,622,607 | 4/1997 | Yamazaki ............................ 204/192.15 |
| 5,812,182 | 9/1998 | Kawai ..................................... 347/262 |
| 5,989,654 | 11/1999 | Yoshioka ................................ 427/579 |

FOREIGN PATENT DOCUMENTS

| | | |
|---|---|---|
| 63-103453 | 5/1988 | Japan . |
| 3-232133 | 10/1991 | Japan . |
| 3-263627 | 11/1991 | Japan . |
| 4-119886 | 4/1992 | Japan . |
| 4-136164 | 5/1992 | Japan . |
| 4-141488 | 5/1992 | Japan . |
| 64904 | 1/1994 | Japan . |
| 9-198712 | 7/1997 | Japan . |
| 2724183 | 11/1997 | Japan . |
| 1079145 | 3/1998 | Japan . |

OTHER PUBLICATIONS

Appl. Phys. Lett., vol. 50, No. 1, Jan. 5, 1987, A. Ogura et al. (pp. 16–18).

Appl Phys. Lett., vol. 50, No. 11, Mar. 16, 1987 Nishida et al. (pp. 667–669).

*Primary Examiner*—Elizabeth Evans
*Attorney, Agent, or Firm*—Birch, Stewart, Kolasch & Birch, LLP

[57] ABSTRACT

In an optical recording information recording medium of a structure having protection layers on both surfaces of a recording layer, overwrite cyclability is improved without deteriorating the reliability of recorded data.

To achieve this, the first protection layer is deposited by a sputtering method from a target made of a mixture comprising ZnS and $SiO_2$ without adding an $O_2$ gas and a $H_2$ gas to a sputtering atmosphere, the second protection layer is deposited by a sputtering method using a target made of a mixture comprising ZnS and $SiO_2$ by adding an $O_2$ gas and an $H_2$ gas to the sputtering atmosphere.

Especially, an optical information recording medium having a high reliability of recorded data and capable of overwriting of 300,000 cycles or more can be obtained, particularly, by controlling the partial pressure of the added $O_2$ gas to $10\times10^{-6}$–$50\times10^{-6}$ Torr and the partial pressure of the added $H_2$ gas to $20\times10^{-6}$–$50\times10^{-6}$ Torr upon deposition of the second protection layer.

11 Claims, 7 Drawing Sheets

OPTICAL INFORMATION RECORDING MEDIUM, AND METHOD FOR FABRICATING IT

This application is the national phase under 35 U.S.C. §371 of prior PCT International Application No. PCT/JP98/02453 which has an International filing date of Jun. 3, 1998 which designated the United States of America.

TECHNICAL FIELD

The present invention is concerned with a novel optical information recording medium. In particular, it relates to an optical information recording medium of excellent reliability capable of optically recording, reading and erasing information at a high speed and at a high density.

BACKGROUND ART

A phase change type optical disc as a sort of optical information recording media uses a material which causes reversible phase change between crystalline and amorphous states as a recording layer, so as to conduct recording and erasing of information by utilizing the nature of the recording layer. The phase change type optical disc is capable of recording new information while erasing preceding information (hereinafter referred to as "overwriting") by merely changing the power of an irradiated laser beam corresponding to new recording information.

As the recording material for the phase change type optical disc capable of overwriting, chalcogen alloys, for example, In—Se series alloys (Appl. Phys. Lett. vol. 50, page 667, 1987) or In—Sb—Te alloy (Appl. Phys. Lett. vol. 50, page 16, 1987) and Ge—Te—Sb alloy have been mainly employed. Recording and erasing on the phase change type optical disc are conducted as described below. That is, upon recording, a laser beam at a high power focused through a lens is at first irradiated to a recording layer to melt the recording layer by raising the temperature to higher than a melting point (about 500 to 600° C.). Successively, the recording layer is quenched by lowering the power of the laser beam. As a result of such rapid heating and quenching, the recording layer becomes amorphous and is in a stable state at a room temperature. An amorphous portion, for example, of about 1 μm is thus formed on the recording layer (recording mark).

Upon erasing, a laser beam at a low power is at first irradiated to the amorphous portion to heat the same to a crystallizing temperature lower than the melting point. Subsequently, the amorphous portion is crystallized by gradual cooling to erase the recording mark.

As described above, since the laser beam at a high power is irradiated to the phase change type optical disc upon recording, a protection layer of high thermal resistance is disposed to both or either one of surfaces of the recording layer in order to prevent thermal damage (for example, deformation of a substrate, oxidation of a recording layer and movement of material along guide grooves).

As the material for the protection layer, materials comprising at least one of oxides, carbides, fluorides, sulfides and nitrides of metals or semi-metals are used. For example, Japanese Patent Laid-Open publication SHO No. 63-103453 proposes use of a mixture comprising, for example, ZnS and $SiO_2$ as the material for the protection layer. It has been known that the protection layer comprising the mixture has higher thermal resistance than the protection layer only consisting of ZnS.

Further, a phase change type optical disc having high recording and erasing characteristics, which is also excellent in overwrite cyclability has been obtained by using a mixture comprising ZnS and $SiO_2$ as the material for the protection layer and optimizing the thickness for each of the layers.

However, since the protection layer present on both surfaces of the recording layer is also repeatedly heated rapidly and quenched by overwriting cycles, there is a danger that the protection layer itself is deformed as the number of cycles increases extremely. If the protection layer itself suffers from deformation as described above, a problem results in that the recording layer is damaged causing a deterioration of the recording and erasing characteristics.

In order to solve the foregoing problem, Japanese Patent Laid-Open publication HEI No. 3-263627 proposes a method of depositing a first protection layer (a protection layer disposed to the recording layer on the side of the substrate) and a second protection layer (a protection layer disposed to the recording layer on the side of the reflection layer) which layers comprise a mixture of ZnS and $SiO_2$, by a sputtering method using a gas mixture comprising Ar, $N_2$ and $O_2$ as a sputtering gas. Japanese Patent Laid-Open publication HEI No. 6-4904 proposes a method of depositing a first protection layer and a second protection layer which layers comprise a mixture of ZnS and $SiO_2$ by a sputtering method using a gas mixture comprising Ar, $N_2$ and $H_2$ as a sputtering gas.

Japanese Patent Laid-Open publication HEI No. 4-119886 proposes a method of incorporating nitrogen into a recording layer and also incorporating oxygen into a first protection layer and a second protection layer which layers comprise a mixture of ZnS and $SiO_2$. It also proposes a method of depositing the first protection layer and the second protection layer by a sputtering method using a gas mixture comprising Ar and $O_2$ as a sputtering gas.

However, even the method disclosed in each of the publications does not have the effect of sufficiently improving the overwrite cyclability of the phase change optical disc. When the overwrite cyclability is improved by the method described above, it results in a deficiency in that the reliability of the recorded data is deteriorated.

The subject of the present invention has been to overcome the noted problems in the prior art by improving the overwrite cyclability without deteriorating the reliability of the recorded data in an optical information recording medium of a structure having protection layers on both surfaces of the recording layer.

DISCLOSURE OF THE INVENTION

The present invention provides an optical information recording medium having, on one surface of a substrate, a first protection layer, a recording layer causing a change in an optical constant by irradiation of a laser beam thereby conducting at least the recording of information, a second protection layer and a reflection layer, wherein the first protection layer is deposited by a sputtering method using a target made of a mixture comprising zinc sulfide (ZnS) and silicon dioxide ($SiO_2$) without adding an oxygen ($O_2$) gas and a hydrogen ($H_2$) gas to the sputtering atmosphere and a second protection layer is deposited by a sputtering method using a target made of a mixture comprising zinc sulfide and silicon dioxide by adding an oxygen gas and a hydrogen gas to the sputtering atmosphere.

According to the optical information recording medium, the first protection layer has a composition comprising a mixture of ZnS and $SiO_2$ substantially without containing O and H (although a slight amount of O and H present in a deposition apparatus may possibly be intruded), while the second protection layer has a composition containing O and H in a mixture comprising ZnS and $SiO_2$. An optical information recording medium excellent both in the reliability of recorded data and the overwrite cyclability can be obtained by incorporating O and H into only the second protection layer comprising a mixture of ZnS and $SiO_2$, while not incorporating O and H into the first protection layer comprising the same mixture.

On the contrary, if a composition contains O and H in the mixture of ZnS and $SiO_2$ in both the second protection layer and the first protection layer, the reliability of the recorded data and the overwrite cyclability are deteriorated.

Preferably, the partial pressure of the $O_2$ gas added is from $10\times10^{-6}$ to $50\times10^{-6}$ Torr and the partial pressure of the $H_2$ gas added is from $10\times10^{-6}$ to $50\times10^{-6}$ Torr upon deposition of the second protection layer. In a further preferred range, the partial pressure of the $O_2$ gas is from $15\times10^{-6}$ to $40\times10^{-6}$ Torr and the partial pressure of the $H_2$ gas is from $15\times10^{-6}$ to $30\times10^{-6}$ Torr.

By controlling the partial pressure of the $O_2$ gas between $10\times10^{-6}$ and $50\times10^{-6}$ Torr, and the partial pressure of the $H_2$ gas between $10\times10^{-6}$ to $50\times10^{-6}$ Torr, an optical information recording medium having high reliability of recorded data and capable of overwriting of 300,000 cycles or more can be obtained.

Further, the present invention provides an optical information recording medium having, on one surface of a substrate, a first protection layer, a recording layer causing a change in an optical constant by irradiation of beam thereby conducting at least information recording, a second protection layer and a reflection layer, wherein the second protection layer has a composition comprising zinc (Zn), sulfur (S), silicon (Si), oxygen (O) and hydrogen (H), and capable of simultaneously satisfying the following formulae (1) and (2), assuming the existent ratio (at %) for each of constituent elements as: Zn:S:Si:O:H=X:Y:Z:α:β (X+Y+Z+α+β=100):

$$\alpha/Z \geq 2.4 \tag{1}$$

$$\beta/(X+Z) \geq 0.07 \tag{2}$$

Film deposition by the sputtering method is conducted in a vacuum apparatus in which the vacuum degree is generally set at $1.0\times10^{-5}$ Torr or less. For instance, "Thin Film Preparation Handbook (edited by Foundation of Association of Applied Physics, Thin Film and Surface Physics Working Group, published from Kyoritsu Shuppan, 1991) contains a description, on page 3, that "vacuum degree upon sputtering is required to be $1.0\times10^{-5}$ Torr or less" "Introduction to Thin Film Technology for Parts and Device" (written by Kobayashi and Hosokawa, published from Sogo Denshi Shuppan Co., 1992) contains a description, on page 179, that "it is preferred to control the vacuum degree at $1.0\times10^{-6}$ Torr or less for dispositing a film stably". This vacuum degree of $1.0\times10^{-5}$ Torr or less can be obtained sufficiently by a conventional marketed sputtering apparatus.

When sputtering is conducted in an apparatus at a vacuum degree of $1.0\times10^{-5}$ Torr or less, using a target made of a mixture comprising ZnS and $SiO_2$ (existent ratio of $SiO_2$: 20 mol %) while adding an $O_2$ gas and a $H_2$ gas in addition to an Ar gas as a usual sputtering gas, the existent ratio of O relative to Si (α/Z) is 2.4 or more, and the existent ratio of H relative to the sum of Si and Zn (β/(X+Y)) is 0.07 or more.

That is, the composition capable of simultaneously satisfying the formulae (1) and (2) does not result from a composition produced by intrusion of O and H present in a slight amount in the deposition apparatus, but instead results from a composition produced as a result of positively adding O and H in a film upon deposition.

Accordingly, the second protection layer of the optical information recording medium has a composition in which O and H are positively added to ZnS and $SiO_2$, by which overwrite cyclability can be improved.

The upper limits for the existent ratio of O relative to Si (α/Z) and the existent ratio of H relative to the sum of Si and Zn (β/(X+Z)) are determined depending on the required reliability of recorded data and the like, and there can be mentioned an upper limit, for example, of 4.0 for (α/Z) and an upper limit, for example, of 0.4 for β/(X+Z). That is, for the composition of the second protection layer in the present invention, a composition capable of simultaneously satisfying the following formulae (3) and (4) is preferred and a composition capable of simultaneously satisfying the following formulae (5) and (6) is further preferred.

$$2.4 \leq \alpha/Z \leq 4.0 \tag{3}$$

$$0.07 \leq \beta/(X+Z) \leq 0.4 \tag{4}$$

$$2.60 \leq \alpha/Z \leq 3.63 \tag{5}$$

$$0.15 \leq \beta/(X+Z) \leq 0.30 \tag{6}$$

It is preferred that the first protection layer in the optical information recording medium has a composition comprising zinc (Zn), sulfur (S), silicon (Si), oxygen (O) and hydrogen (H), and can simultaneously satisfy the following formulae (7) and (8), assuming the existent ratio (at %) for each of constituent elements as; Zn:S:Si:O:H=X:Y:Z:α:β (X+Y+Z+α+β=100)

$$\alpha/Z < 2.4 \tag{7}$$

$$\beta/(X+Z) < 0.07 \tag{8}$$

The composition capable of simultaneously satisfying the formulae (7) and (8) does not result from a composition produced as a result of positively adding O and H in a film, but results from a composition produced by intrusion of O and H present in a slight amount in a deposition apparatus upon deposition of the protection layer comprising ZnS and $SiO_2$.

Accordingly, the optical information recording medium according to the present invention, in which the composition of the first protection layer can simultaneously satisfy the formulae (7) and (8), and the composition of the second protection layer can satisfy the formulae (1) and (2) simultaneously, or the formulae (3) and (4) simultaneously or the formulae (5) and (6) simultaneously, is excellent both in the reliability of recorded data and the overwrite cyclability.

The present invention also provides a process for producing an optical information recording medium including a step of forming, on one surface of a substrate, a first protection layer, a recording layer causing a change in an optical constant by irradiation of beam thereby conducting at least recording of information, a second protection layer and a reflection layer successively, wherein the second protection layer is formed by a sputtering method using a target made of a mixture comprising zinc sulfide and silicon dioxide by adding an $O_2$ gas and $H_2$ gas to a sputtering atmosphere.

According to this process, O and H are positively added to a film comprising ZnS and SiO$_2$ upon deposition of the second protection layer.

In the process according to the present invention, it is preferred that the partial pressure of the O$_2$ gas added is from $10\times10^{-6}$ to $50\times10^{-6}$ Torr and the partial pressure of the H$_2$ gas added is from $10\times10^{-6}$ to $50\times10^{-6}$ Torr upon deposition of the second protection layer.

In the process of the present invention, it is more preferred that the partial pressure of the O$_2$ gas added is from $10\times10^{-6}$ to $50\times10^{-6}$ Torr and the partial pressure of the H$_2$ gas added is from $20\times10^{-6}$ to $50\times10^{-6}$ Torr upon deposition of the second protection layer. According to the process, the composition of the second protection layer can simultaneously satisfy the formulae (5) and (6).

In the process according to the present invention, deposition of the second protection layer is preferably conducted by adding a nitrogen (N$_2$) gas in addition to the O$_2$ gas and the H$_2$ gas into the sputtering atmosphere. Addition of the N$_2$ gas provides the identical type of effect with that of the addition of the O$_2$ gas, but the extent of the effect obtained by the same amount of addition is smaller than that of the addition of the O$_2$ gas. Accordingly, the effect by the addition of the O$_2$ gas can be finely controlled by the addition of the N$_2$ gas.

As described above, the present invention lies in the optical information recording medium having specific compositions of the second protection layer and the first protection layer. There is no particular restriction on the other components, therefore any components known so far can be adopted.

Namely, as a substrate, it is possible to use a substrate made of polycarbonate or glass having satisfactory optical characteristics, high mechanical strength and excellent dimensional stability which have been used thus far as substrates for optical discs.

As the material for the recording layer, Te or Se-based alloys such as Sb—Te—Ge, In—Sb—Te, In—Sb—Te—Ag, In—Se—Tl, Ge—Te—Sn—Au, Sb—Te—Ge—Pd, Sb—Te—Ge—Pt and Sb—Te—Ge—Nb are preferred.

Among them, a Sb—Te—Ge alloy or a Sb—Te—Ge alloy with addition of a fourth element is preferred since the crystallizing rate differs depending on the composition and, accordingly, a recording layer having a required crystallizing rate can be formed easily. That is, while preferred crystallizing rate of the recording layer varies depending on the rotational speed of the disc or the thickness of the first protection layer and the second protection layer, there exists a wide range of requirements for the rotational speed of the disc and the thickness of the protection layer. Accordingly, the use of the aforesaid alloys as the material for the recording layer can easily withstand such a wide range of requirements.

Further, the thickness of the recording layer is determined depending on the reflectivity or the recording sensitivity required for the optical information recording medium, and it is preferably from 15 nm to 120 nm in the case of a phase change type optical disc drive in general use at the present.

For the material of the reflection layer, metals such as Al, Cr, Ni, Au, Ti, Zr, Hf, Si, Mg, or alloys thereof are preferred due to light reflectance and thermal conductivity considerations. Among them, use of an Al- or Au-based alloy is preferred and, particularly, use of an alloy containing Cr, Ti, Zr, Hf, Si, Cu or the like at a ratio from 0.5 at % to 10 at % based on Al is preferred due to corrosion resistance and economical considerations.

It is sufficient that the reflection layer have a range of thickness capable of efficiently dissipating heat generated in the recording layer and obtaining an optical enhancement effect to the contrast or C/N (carrier to noise ratio) and, generally, it is preferably from 30 nm to 300 nm. If it is less than 30 nm, the optical enhancement effect is deteriorated, whereas if it exceeds 300 nm, the laser power required for heating the recording layer is undesirably increased.

A synthetic resin film is preferably disposed on the reflection layer with a purpose of protecting and reinforcing the film. As the synthetic resin film, a UV-ray curable resin (urethane, urethane acrylate, epoxy acrylate, acryl, silicone or polyester type resin) or hot melt adhesive may be used. The thickness of the synthetic resin film is preferably from 5 $\mu$m to 50 $\mu$m, while it differs depending on the way the optical information recording medium is used (for example, whether two discs are laminated to be adhered with each other in use or one disc is used as it is).

Further, as a method of improving the thermal resistance of the optical information recording medium to improve the overwrite cyclability, it is proposed to dispose a third protection layer between the second protection layer and the reflection layer. In this method, since the protection layer present at the surface of the recording layer facing the reflection layer undergoes the effect of heat upon recording and erasing to the greatest extent, the protection layer is divided into two layers to share the function. Namely, of the divided two layers, the third protection layer present on the side of the reflection layer is provided with thermal resistance, while the second protection layer in contact with the recording layer is provided with an adhesive property with the recording layer. This can further improve the overwrite cyclability.

The optical information recording medium according to the present invention may be of a structure having such a third protection layer. In this case, it is not always necessary to incorporate H and O into the third protection layer, providing that the composition of the second protection layer (or the composition of the first protection layer and the second protection layer) is within the scope of the present invention.

The thickness of the second protection layer is defined to such a value as within a range capable of obtaining desired optical characteristics and sensitivity irrespective of the absence or presence of the third protection layer. Generally, it is preferred to define the thickness from 1 nm to 100 nm and, more preferably, from 10 nm to 50 nm due to recording sensitivity and overwrite cyclability considerations.

Further, the thickness of the first protection layer is preferably from 50 nm to 400 nm which takes into consideration the reflectivity of the optical information recording medium, the thermal resistance of the substrate and the productivity, irrespective of the absence or presence of the third protection layer.

BEST MODE FOR PRACTICING THE INVENTION

Figure 1:
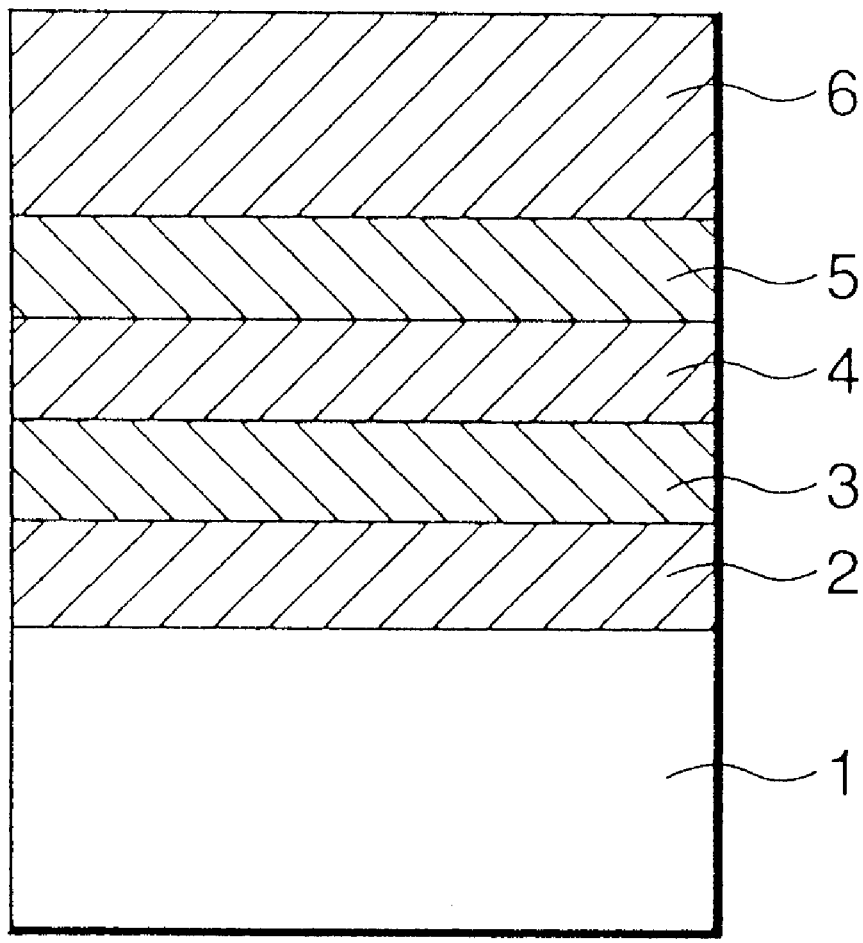
FIG. 1 is a cross sectional view showing one embodiment of a layer structure of an optical information recording medium according to the present invention.

Preferred embodiments of the present invention will now be explained with reference to concrete examples and comparative examples.

Relationship Between The Addition Amount Of Gases Upon Film Deposition And Film Compositon At first, a relationship between the addition amount of gases upon film deposition and the composition of the obtained thin film was examined as described below.

On one surface of a polycarbonate substrate of 1.2 mm thickness for use in a phase change type optical disc, a $Sb_{22.0}Te_{55.0}Ge_{23.0}$ film was deposited to a thickness of 100 nm at first by a sputtering method using a target made of a Sb—Te—Ge alloy.

Then, a protection layer of 100 nm was deposited by a sputtering method using a target made of a mixture comprising ZnS and an $SiO_2$ ($SiO_2$ content: 20 mol %), while adding an $H_2$ gas and an $O_2$ gas each at a partial pressure shown in the following Table 1 into a sputtering atmosphere. In this process the flow rate of an Ar gas introduced as a sputtering gas was adjusted such that the entire pressure was $5 \times 10^{-3}$ Torr after the addition of the $H_2$ gas and the $O_2$ gas. In addition, a sample was also prepared by depositing a similar protection layer without adding the $H_2$ gas and the $O_2$ gas. Also in this case, the Ar gas was introduced so as to control the entire pressure to $5 \times 10^{-3}$ Torr.

Then, an Al alloy was formed to 10 nm on the protection layer in order to prevent external intrusion of impurities, moisture absorption and oxidation. Each layer was deposited in a vacuum apparatus at a vacuum degree of $1.0 \times 10^{-5}$ Torr or less.

The composition of the protection layer of the thus prepared sample was measured by SIMS (Secondary Ion Mass Spectrometry) and the value converted from the result of the measurement into an accurate value by a calibration curve was determined as an analysis value. Analysis for preparing the calibration curve was conducted by a measuring method of oblique incidence of $He^{++}$ ions as a beam source by HFS (Hydrogen Forward Scattering) for H and by RBS (Rutherford Back Scattering) for elements other than H. The measuring conditions are as shown below.

| Analysis conditions for RBS | |
| --- | --- |
| $He^{++}$ Ion Beam Energy | 2.275 MeV |
| Normal Detector Angle | 160° |
| Grazing Detector Angle | 114° |

-continued

| Analysis conditions for HFS | |
| --- | --- |
| $He^{++}$ Ion Beam Energy | 2.275 MeV |
| Normal Detector Angle | 160° |
| Grazing Detector Angle | 30° |
| Ion Beam To Sample Normal | 75° |

Compositions of the protection layer of the thus measured samples are shown in Table 1.

| Partial pressure ($\times 10^{-6}$) | | Result of Analysis (at %) | | | | | | | |
| --- | --- | --- | --- | --- | --- | --- | --- | --- | --- |
| $O_2$ | $H_2$ | Zn | S | Si | O | H | Ar | α/Z | β/(X + Z) |
| 0 | 0 | 29.6 | 25.0 | 12.8 | 29.5 | 2.6 | 0.5 | 2.30 | 0.06 |
| 0 | 20 | 27.8 | 24.2 | 12.5 | 29.7 | 5.6 | 0.2 | 2.38 | 0.14 |
| 10 | 10 | 27.7 | 23.1 | 12.5 | 32.0 | 4.5 | 0.2 | 2.56 | 0.11 |
| 10 | 20 | 26.9 | 22.8 | 12.3 | 32.0 | 5.8 | 0.2 | 2.60 | 0.15 |
| 10 | 50 | 24.2 | 22.1 | 11.9 | 31.8 | 9.8 | 0.2 | 2.67 | 0.27 |
| 20 | 0 | 27.9 | 22.4 | 12.5 | 33.8 | 3.2 | 0.2 | 2.70 | 0.08 |
| 20 | 10 | 27.0 | 21.8 | 12.3 | 34.3 | 4.4 | 0.2 | 2.79 | 0.11 |
| 20 | 20 | 25.9 | 21.4 | 12.1 | 34.5 | 5.9 | 0.2 | 2.85 | 0.16 |
| 20 | 50 | 23.3 | 20.4 | 11.7 | 34.8 | 9.6 | 0.2 | 2.97 | 0.27 |
| 50 | 10 | 24.1 | 17.7 | 11.8 | 41.4 | 4.8 | 0.2 | 3.49 | 0.13 |
| 50 | 20 | 23.5 | 17.6 | 11.8 | 41.1 | 5.8 | 0.2 | 3.51 | 0.16 |
| 50 | 50 | 20.9 | 16.8 | 11.3 | 41.2 | 9.6 | 0.2 | 3.63 | 0.30 |
| 20 | 77 | 21.2 | 19.6 | 11.3 | 34.7 | 13.0 | 0.2 | 3.05 | 0.40 |
| 70 | 20 | 21.7 | 14.9 | 11.5 | 46.0 | 5.7 | 0.2 | 4.00 | 0.17 |

EXAMPLE 1

Phase change type optical discs each of a layer structure shown in FIG. 1 were prepared as described below.

At first, a first protection layer (2) of 150 nm thickness was deposited by an RF sputtering method using a target made of a mixture comprising ZnS and $SiO_2$ ($SiO_2$ content: 20 mol %) on a polycarbonate substrate 1 of 120 mm diameter and 1.2 mm thickness in which guide grooves for laser beam were formed at 1.2 μm pitch. The first protection layer (2) was deposited in a vacuum apparatus at a vacuum degree of $10 \times 10^{-5}$ Torr or less, using an Ar gas as a sputtering gas and with no addition of gases such as $H_2$, $N_2$ and $O_2$ at all. Further, the Ar gas was introduced at such a flow rate that the entire pressure was $5 \times 10^{-3}$ Torr.

Then, a recording layer (3) of 25 nm thickness comprising $Sb_{22.0}Te_{55.0}Ge_{23.0}$ was deposited on the first protection layer (2) by a sputtering method using a target made of a Sb—Te—Ge alloy.

Then, a second protection layer (4) of 35 nm thickness was deposited on the recording layer (3) by an RF sputtering method using the same target as that for the first protection layer (2). The second protection layer (4) was deposited in a vacuum apparatus at a vacuum degree of $1.0 \times 10^{-5}$ Torr or less using an Ar gas as a sputtering gas and adding a $H_2$ gas, an $N_2$ gas and an $O_2$ gas into a sputtering atmosphere. The $H_2$ gas and the $N_2$ gas were added each at a partial pressure of $20 \times 10^{-6}$ Torr, while the $O_2$ gas was added while varying the addition amount. The Ar gas was introduced while controlling the flow rate such that the entire pressure was $5 \times 10^{-3}$ Torr after the addition of the $H_2$ gas, the $N_2$ gas and the $O_2$ gas.

Then, a reflection layer (5) of 150 nm thickness comprising an Al alloy was deposited on the second protection layer (4). Further, an acrylic UV-ray curable resin was coated thereon to 10 μm by a spin coating method and then cured by irradiation of UV-rays to form a synthetic resin film (6).

An initializing process for crystallizing the recording layer (3) deposited in an amorphous state was conducted by irradiating a laser beam from the side of the substrate (1) to each of the thus obtained samples of the phase change type optical discs. The laser irradiation device used had a semiconductor laser at 1 W power and an objective lens having a numerical aperture of 0.5, and the laser beam was irradiated under the conditions at an irradiation power of 600 mW and at a linear velocity of a disc at m/s.

Each of the initialized samples was put to a recording device having a laser beam at a wavelength of 780 nm and an objective lens with a numerical aperture of 0.5, and a random pattern of 2–7 RLL code was recorded once under rotation at a linear velocity of about 12 m/s. The laser beam was irradiated while modulating a peak power (recording power) to 12 mW and a bias power (erasing power) to 6 mW.

A test for evaluating the reliability of the recorded data for each of the samples was conducted as shown below.

At first, for each of the samples, the data recorded once as described above was read out to measure BER (Bite Error Rate). Then, an acceleration test was conducted whereby each of the samples were left in an atmosphere at 90° C. and 80% RH for 600 hours, and the recorded data was again read out to measure BER after the acceleration test. Then, the ratio of BER upon reading after the acceleration test relative to BER upon reading before the acceleration test was calculated as an increment ratio of errors. The value denotes the archival characteristics (shelf life of recorded data).

Further, after the acceleration test, a random pattern of 2–7 RLL code was overwritten on the recorded data and the overwritten data was read out to measure the BER. Then, an increment ratio of errors was calculated by dividing the measured BER value by a measured BER value upon reading before the acceleration test. This value denotes overwrite cyclability (rewritable life on the recorded data).

Figure 2:
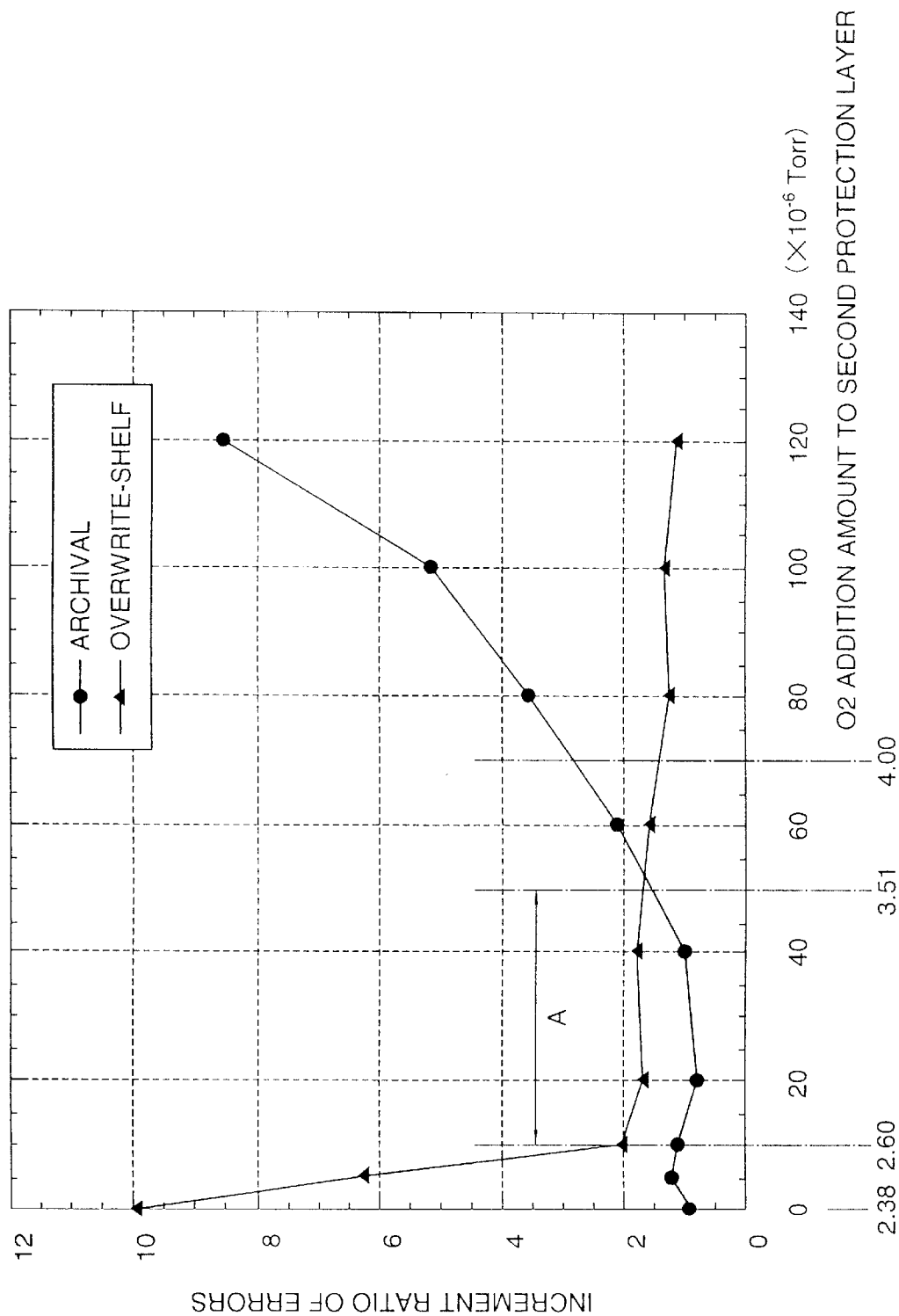
FIG. 2 is a graph illustrating a relationship between the amount of O$_2$ added upon depositing a second protection layer and archival and overwrite-shelf characteristics from Example 1.

The results are shown in FIG. 2. FIG. 2 is a graph illustrating a relationship between the increment ratio of errors and the addition amount of $O_2$ to the second protection layer (amount of $O_2$ added upon deposition of the second protection layer), regarding the archival characteristics and the overwrite-shelf characteristic. The values corresponding to the $O_2$ addition amount (α/Z) are also shown on the abscissa in FIG. 2.

As can be seen from the graph, the overwrite-shelf characteristics tend to deteriorate in a region where $O_2$ addition amount is 0 or small, while the archival characteristics tend to deteriorate in a region where the $O_2$ addition amount is great. Further, if the $O_2$ addition amount as a partial pressure is from $10\times10^{-6}$ Torr to $50\times10^{-6}$ Torr (namely, in a range shown by A in FIG. 2 in which the value (α/Z) is from 2.60 to 3.51), the increment ratio of errors reduces to 2.0 or less for both characteristics so as to obtain satisfactory characteristics. Further, if the (α/Z) value is from 2.60 to 4.00, the increment ratio of errors is 3.0 or less for both characteristics.

EXAMPLE 2

The second protection layer (4) was deposited by adding the $O_2$ gas and the $N_2$ gas such that each of the partial pressures was $20\times10^{-6}$ Torr, while varying the addition amount of the $H_2$ gas. Phase change type optical discs each having a layer structure shown in FIG. 1 were prepared in the same manner as in Example 1 except for the difference as described above.

Each of the thus obtained samples of the phase change type optical discs was subjected to an initializing process by the irradiation of a laser beam in the same manner as in Example 1.

Then, a test of evaluating the overwrite cyclability for each of the samples was conducted as below.

That is, each of the initialized samples was put to the same recording device as in Example 1 and a random pattern of 2–7 RLL code was overwritten while rotating the disc at a linear velocity of about 12 m/s under the conditions at a peak power of 12 mW and a bias power of 6 mW. In this case, BER was measured on every predetermined number of overwriting cycles, and it was evaluated by determining whether each of the samples was verifiable or not based on the result of the measurement, and the maximum value of the number of the verifiable overwriting cycles was investigated. The value was defined as "number of cycles".

Further, a test for evaluating the reliability of recorded data in each of the samples was conducted as below.

That is, each of the initialized samples was at first put to the recording device identical with that in Example 1 and a random pattern of 2–7 RLL code was recorded once under rotation at a linear velocity of about 12 m/s under the conditions at a peak power of 13.2 mW and a bias power of 6.6 mW and then BFR was measured.

After leaving the sample at a room temperature for 48 hours, a random pattern of 2–7 RLL code was overwritten on the recorded data described above, and BFR for the overwritten recorded data was measured. Then, a value obtained by dividing the measured BER value by a measured BER value read out after recording once was calculated as an increment ratio of errors. The value denotes the aging change of errors (cross-power characteristic).

Figure 3:
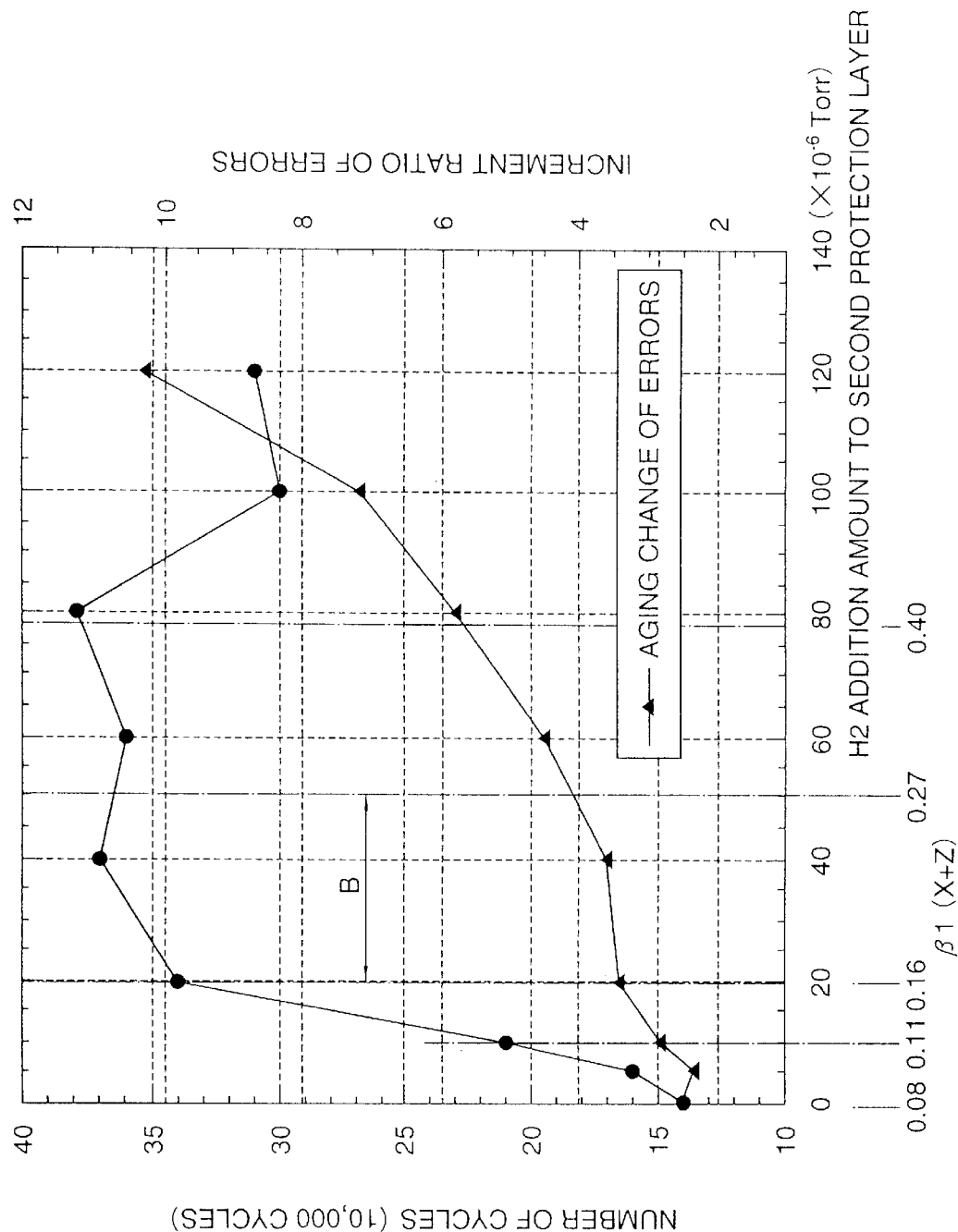
FIG. 3 is a graph illustrating a relationship between the amount of H$_2$ added upon depositing a second protection layer and, an overwrite cyclability and aging change characteristics of errors in Example 2.

The results are shown in FIG. 3. FIG. 3 is a graph illustrating a relationship between the number of cycles and the increment ratio of errors, and the addition amount of $H_2$ for the second protection layer (amount of $H_2$ added upon deposition of the second protection layer). Further, FIG. 3 also shows the (β/(X+Z)) value corresponding to the $H_2$ addition amount on the abscissa.

As can be seen from the graph, the number of cycles is lowered at the $H_2$ addition amount of 0 and in a region where the $H_2$ addition amount is small and the number of cycles is increased where the $H_2$ addition amount increases so that high number of cycles are obtained such as 200,000 cycles or more as the partial pressure increases above $10\times10^{-6}$ Torr, and 300,000 cycles or more as the partial pressure increases above $20\times10^{-6}$ Torr (β/(X+Z) value is 0.16). Referring to the aging change of the errors, the increment ratio of errors increases along with increase of the $H_2$ addition amount and, if the $H_2$ addition amount is $50\times10^{-6}$ Torr or less (β/(X+Z) value is 0.27 or less), the increment ratio of errors is 4.0 or less. Further, if (β/(X+Z)) value is 0.40 or less, the increment ratio of errors is 6.0 or less.

Accordingly, it can be seen that a phase change type optical disc having a particularly excellent overwrite cyclability and cross power characteristic can be obtained if the $H_2$ addition amount is controlled between $20\times10^{-6}$ and $50\times10^{-6}$ Torr (a range shown by B in FIG. 3 where (β/(X+Z) value is 0.16–0.27).

COMPARATIVE EXAMPLE 1

The first protection layer 2 was deposited in a vacuum apparatus at a vacuum degree of $1.0\times10^{-5}$ Torr, by using an Ar gas as a sputtering gas and adding a $H_2$ gas, an $N_2$ gas and an $O_2$ gas to a sputtering atmosphere. The $O_2$ gas and the $N_2$ gas were added such that each of the partial pressures was $20\times10^{-6}$ Torr while varying the addition amount of $H_2$ gas. The Ar gas was introduced after the addition of the $H_2$ gas, the $N_2$ gas and the $O_2$ gas while controlling the flow rate such that the entire pressure was $5\times10^{-3}$ Torr. Further, the second protection layer 4 was deposited by adding the $O_2$ gas and the $N_2$ gas each at a partial pressure of $20\times10^{-6}$ Torr while varying the addition amount of the $H_2$ gas.

Phase change optical discs each having a layer structure shown in FIG. 1 were prepared quite in the same manner as in Example 1 except for the difference as described above.

Figure 4:
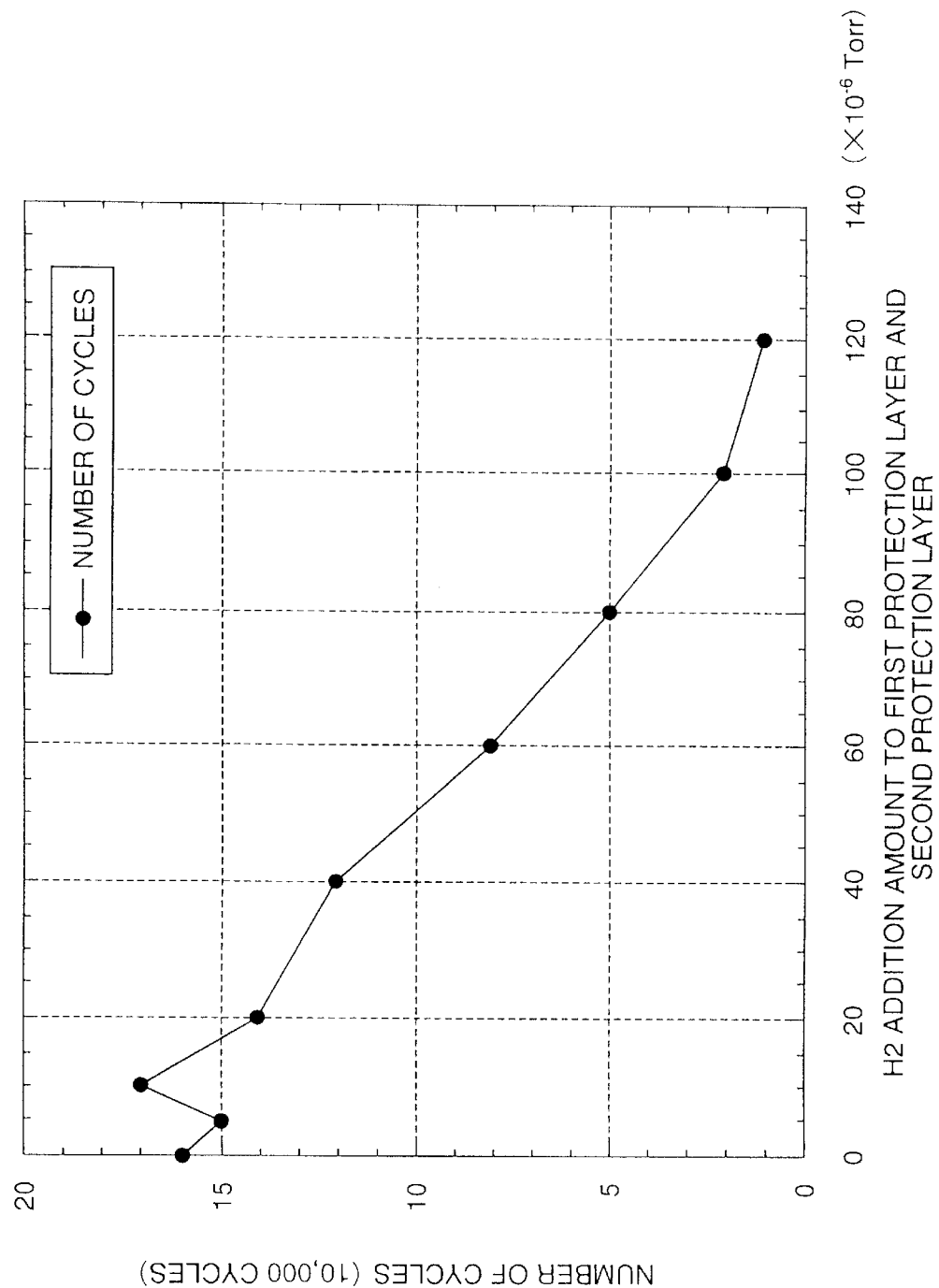
FIG. 4 is a graph illustrating a relationship between the amount of H$_2$ added upon depositing a first protection layer and a second protection layer, and overwrite cyclability from Comparative Example 1.

Each of the thus obtained samples of the phase change type optical discs was put to an initializing process by irradiating a laser beam in the same manner as in Example 1. Then, a test for evaluating the overwrite cyclability for each of samples was conducted in the same manner as that in Example 2. The results are shown in FIG. 4. FIG. 4 is a graph illustrating a relationship between the number of cycles, and the $H_2$ addition amount (amount of $H_2$ added upon film deposition) for the first protection layer and the second protection layer.

As can be seen from the graph, the number of cycles decreased with the increase of the $H_2$ addition amount. Further, comparing the result with the results of the evaluation test for the overwrite cyclability in Example 2, it can be seen that the overwrite cyclability is deteriorated by adding $H_2$ upon deposition of the first protection layer.

COMPARATIVE EXAMPLE 2

The first protection layer 2 and the second protection layer 4 were deposited by adding a $H_2$ gas and an $N_2$ gas such that each of the partial pressures was $20\times10^{-6}$ Torr while varying the addition amount of the $O_2$ gas. Phase change type optical discs each having a layer structure shown in FIG. 1 were prepared by the method identical with that in Comparative Example 1 except for the difference as described above.

Each of the thus obtained samples of the phase change type optical discs was subjected to an initializing process by the irradiation of a laser beam in the same manner as in Example 1. Then, a test for evaluating the overwrite cyclability for each of the samples was conducted in the same manner as in Example 2. Further, a test for evaluating the archival characteristics for each of the samples was conducted in the same manner as in Example 1.

Figure 5:
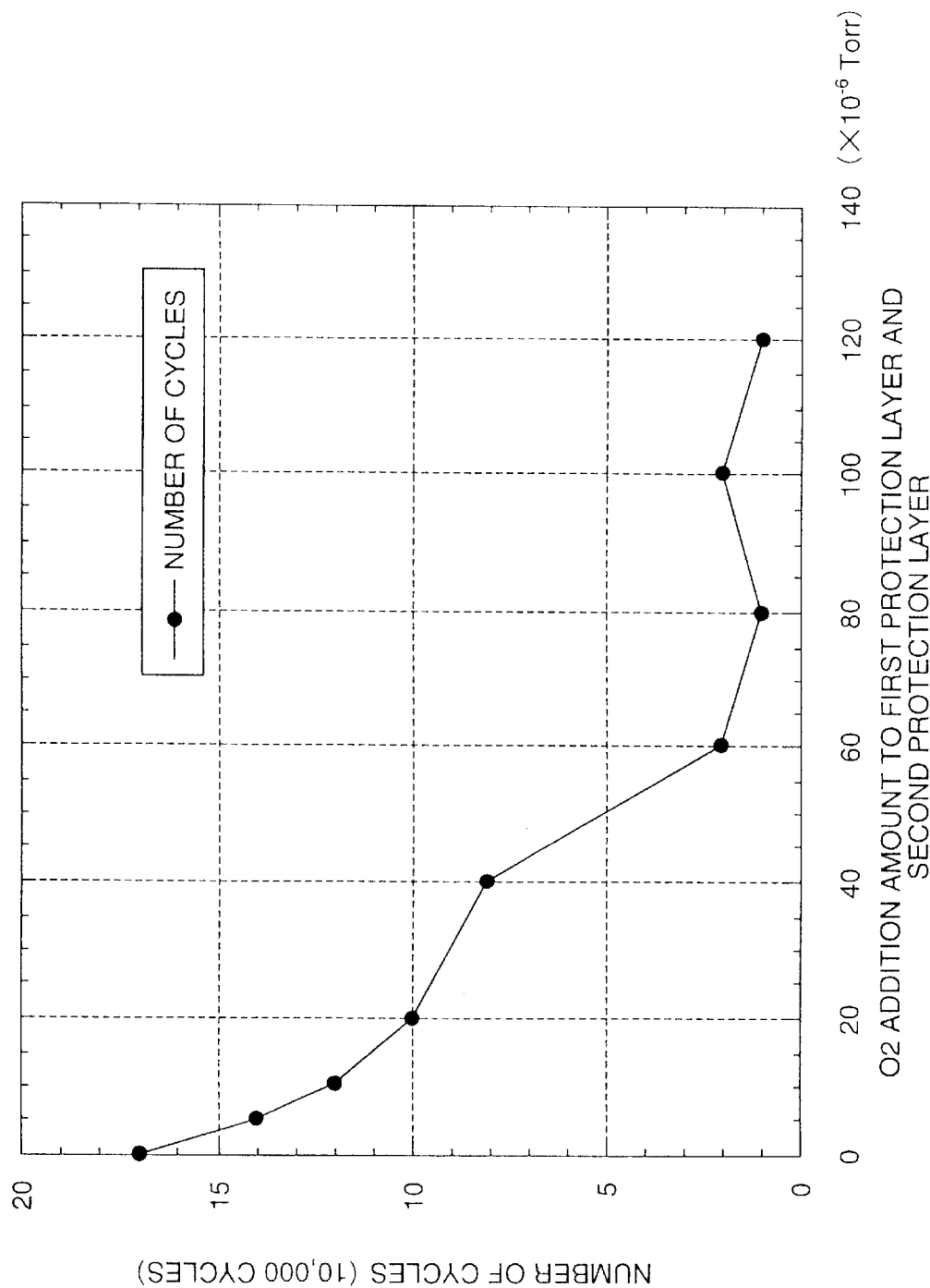
FIG. 5 is a graph illustrating a relationship between the amount of $O_2$ added upon depositing a first and a second protection layers, and overwrite cyclability from Comparative Example 2.

Results for the overwrite cyclability are shown in FIG. 5. FIG. 5 is a graph illustrating a relationship between the number of cycles and the $O_2$ addition amount (amount of $O_2$ added upon deposition) to the first protection layer and the second protection layer. As can be seen from the graph, the number of cycles decreased as the $O_2$ addition amount to the first protection layer and the second protection layer increased.

Figure 6:
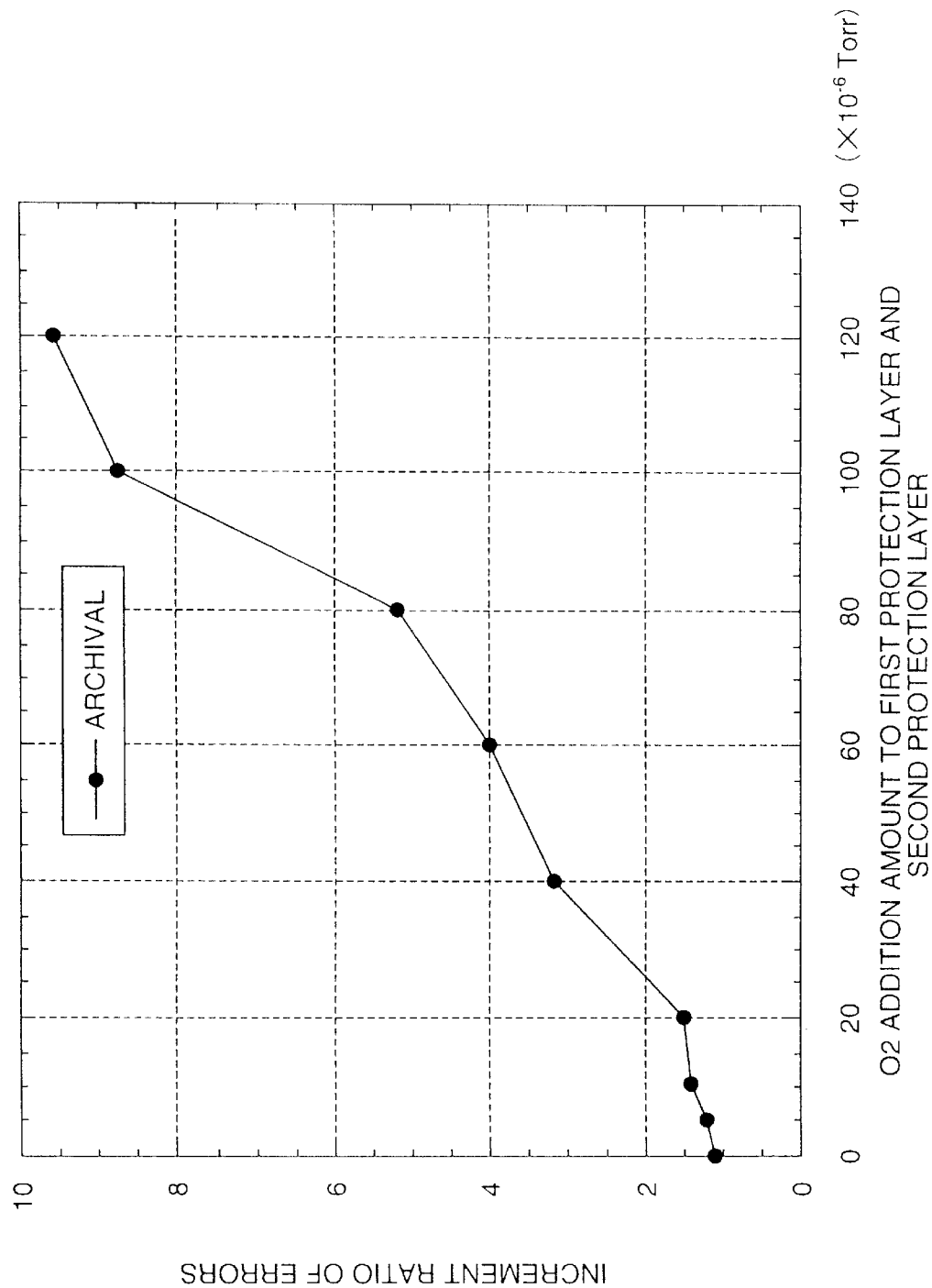
FIG. 6 is a graph illustrating a relationship between the amount of $O_2$ added upon depositing a first and a second protection layers, and archival and overwrite-shelf characteristics from Comparative Example 2.

The results for the archival characteristics are shown in FIG. 6. FIG. 6 is a graph illustrating a relationship between the increment ratio of errors and the $O_2$ addition amount (amount of $O_2$ added upon deposition) to the first protection layer and the second protection layer. As can be seen from the graph, the archival characteristics deteriorated in accordance with the increase of the $O_2$ addition amount. Further, comparing the results with the results of the archival characteristics in Example 1, it can be seen that the archival characteristics became worse with the addition of $O_2$ upon deposition of the first protection layer.

EXAMPLE 3

The second protection layer 4 was deposited by adding an $O_2$ gas and a $H_2$ gas such that each of the partial pressures was $20\times10^{-6}$ Torr while varying the addition amount of an $N_2$ gas. The phase change type optical discs each having a layer structure shown in FIG. 1 were prepared in the same manner as in Example 1 except for the difference as described above.

Figure 7:
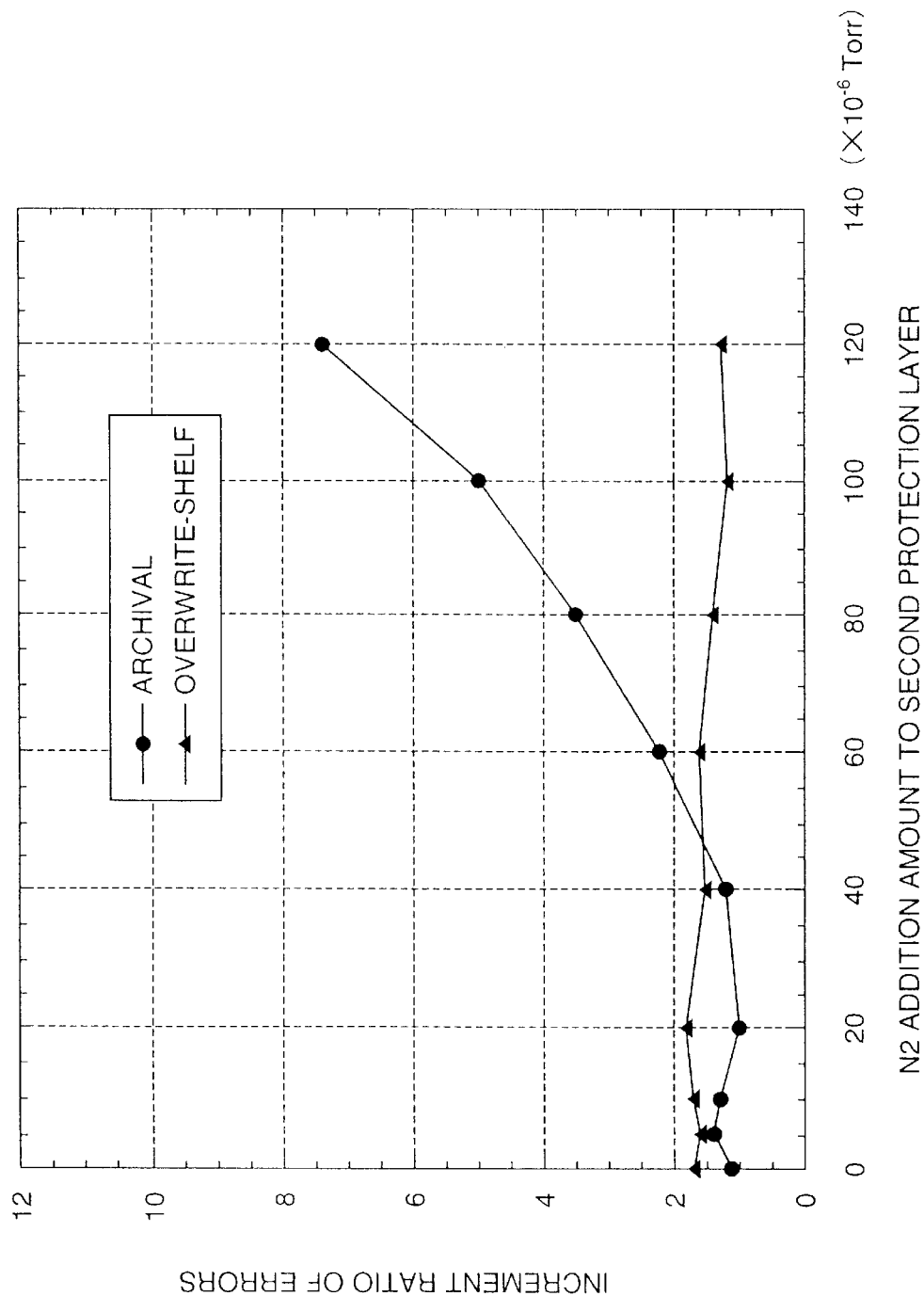
FIG. 7 is a graph illustrating a relationship between the amount of $N_2$ added upon depositing a second protection layer, and archival and overwrite-shelf characteristics from Example 3.

Each of the thus obtained samples of the phase change type optical discs was subjected to an initializing process by the irradiation of a laser beam in the same manner as in Example 1. Then, a test of evaluating the archival characteristics and the overwrite-shelf characteristics for each of the samples was conducted in the same manner as in Example 1. The results are shown in FIG. 7. FIG. 7 is a graph illustrating a relationship between the increment ratio of errors and the $N_2$ addition amount for the second protection layer (amount of $N_2$ added upon film deposition) for each of the characteristics.

As can be seen from the graph, the archival characteristics deteriorated with the increase of the $N_2$ addition amount, and the increment ratio of errors can be kept to less than 2 if the $N_2$ addition amount, as the partial pressure, is decreased to lower than $50\times10^{-6}$ Torr or less. Further, comparing the results of the overwrite-shelf characteristics of the graph with the results of the overwrite-shelf characteristics in Example 1, it can be seen that the degree of change in the increment ratio of errors when the $N_2$ addition amount is varied is smaller than that when the $O_2$ addition amount is varied by the same amount.

This invention has described a rewritable phase change optical disc capable of erasing, as well as recording. The optical information recording medium of the present invention is not restricted to only this embodiment but it is also applicable to any kind of optical information recording media having a recording layer causing a change of an optical constant by the irradiation of beam thereby conducting at least recording of information. For example, in a case of a write-once optical disc capable of recording only once, the reliability of the recorded data can be improved by defining the second protection layer (or first protection layer and second protection layer) within a range of the present invention.

Industrial Applicability

As described above, the present invention provides an optical information recording medium excellent both in the reliability of the recorded data and the overwrite cyclability.

What is claimed is:

1. An optical information recording medium having, on one surface of a substrate, a first protection layer, a recording layer causing a change in an optical constant by irradiation of a beam thereby conducting at least the recording of information, a second protection layer and a reflection layer, wherein the first protection layer is deposited by a sputtering method using a target made of a mixture comprising zinc sulfide (ZnS) and silicon dioxide ($SiO_2$) without adding an oxygen ($O_2$) gas and a hydrogen ($H_2$) gas to the sputtering atmosphere and a second protection layer is deposited by a sputtering method using a target made of a mixture comprising zinc sulfide and silicon dioxide by adding the an oxygen gas and a hydrogen gas to the sputtering atmosphere.

2. An optical information recording medium as defined in claim 1, wherein the partial pressure of the $O_2$ gas added is from $10\times10^{-6}$ to $50\times10^{-6}$ Torr and the partial pressure of the $H_2$ gas added is from $10\times10^{-6}$ to $50\times10^{-6}$ Torr upon deposition of the second protection layer.

3. An optical information recording medium as defined in claim 1, wherein the partial pressure of the $O_2$ gas added is from $10\times10^{-6}$ to $50\times10^{-6}$ Torr and the partial pressure of the $H_2$ gas added is from $20\times10^{-6}$ to $50\times10^{-6}$ Torr upon deposition of the second protection layer.

4. An optical information recording medium having, on one surface of a substrate, a first protection layer, a recording layer causing a change in an optical constant by irradiation of a beam thereby conducting at least recording of information, a second protection layer and a reflection layer, wherein the second protection layer has a composition comprising zinc (Zn), sulfur (S), silicon (Si), oxygen (O) and hydrogen (H), and capable of simultaneously satisfying the following formulae (1) and (2), wherein the existent ratio (at %) for each of constituent elements as: Zn:S:Si:O:H=X:Y:Z:α:β (X+Y+Z+α+β=100):

$$\alpha/Z \geq 2.4 \qquad (1)$$

$$\beta/(X+Z) \geq 0.07 \qquad (2).$$

5. An optical information recording medium having, on one surface of a substrate, a first protection layer, a recording layer causing a change in an optical constant by irradiation of a beam thereby conducting at least recording of information, a second protection layer and a reflection layer, wherein the second protection layer has a composition comprising zinc (Zn), sulfur (S), silicon (Si), oxygen (O) and hydrogen (H), and capable of simultaneously satisfying the following formulae (3) and (4), wherein the existent ratio (at %) for each of constituent elements as: Zn:S:Si:O:H=X:Y:Z:α:β (X+Y+Z+α+β=100);

$$2.4 \leq \alpha/Z \leq 4.0 \qquad (3)$$

$$0.07 \leq \beta/(X+Z) \leq 0.4 \qquad (4).$$

6. An optical information recording medium having, on one surface of a substrate, a first protection layer, a recording layer causing a change in an optical constant by irradiation of a beam thereby conducting at least recording of information, a second protection layer and a reflection layer, wherein the second protection layer has a composition comprising zinc (Zn), sulfur (S), silicon (Si), oxygen (O) and hydrogen (H), and capable of simultaneously satisfying the following formulae (5) and (6), wherein the existent ratio (at %) for each of constituent elements as: Zn:S:Si:O:H=X:Y:Z:α:β (X+Y+Z+α+β=100):

$$2.60 \leq \alpha/Z \leq 3.63 \qquad (5)$$

$$0.15 \leq \beta/(X+Z) \leq 0.30 \qquad (6).$$

7. An optical information recording medium as defined in any one of claims 4 to 6, wherein the first protection layer has a composition comprising zinc (Zn), sulfur (S), silicon (Si), oxygen (O) and hydrogen (H), and capable of simultaneously satisfying the following formulae (7) and (8), wherein the existent ratio (at %) for each of constituent elements as: Zn:S:Si:O:H=X:Y:Z:α:β (X+Y+Z+α+β=100):

$$\alpha/Z < 2.4 \qquad (7)$$

$$\beta/(X+Z) < 0.07 \qquad (8).$$

8. A process for producing an optical information recording medium including a step of forming successively, on one surface of a substrate, a first protection layer, a recording layer causing a change in an optical constant by irradiation of a beam thereby conducting at least recording of information, a second protection layer and a reflection layer, wherein the second protection layer is deposited by a sputtering method using a target comprising a mixture of zinc sulfide and silicon dioxide by adding an $O_2$ gas and a $H_2$ gas to a sputtering atmosphere.

9. A process for producing an optical information recording medium as defined in claim 8, wherein the partial pressure of the $O_2$ gas added is from $10\times10^{-6}$ to $50\times10^{-6}$ Torr and the partial pressure of the $H_2$ gas added is from $10\times10^{-6}$ to $50\times10^{-6}$ Torr upon deposition of the second protection layer.

10. A process for producing an optical information recording medium as defined in claim 8, wherein the partial pressure of the $O_2$ gas added is from $10\times10^{-6}$ to $50\times10^{-6}$ Torr and the partial pressure of the $H_2$ gas added is from $20\times10^{-6}$ to $50\times10^{-6}$ Torr upon deposition of the second protection layer.

11. A process for producing an optical information recording medium as defined in any one of claims 8 to 10, wherein the second protection layer is deposited by further adding an nitrogen ($N_2$) gas in addition to the $O_2$ gas and the $H_2$ gas into the sputtering atmosphere.

* * * * *